G. G. WORSTALL.
PLIERS.
APPLICATION FILED DEC. 30, 1915.
1,178,369.
Patented Apr. 4, 1916.
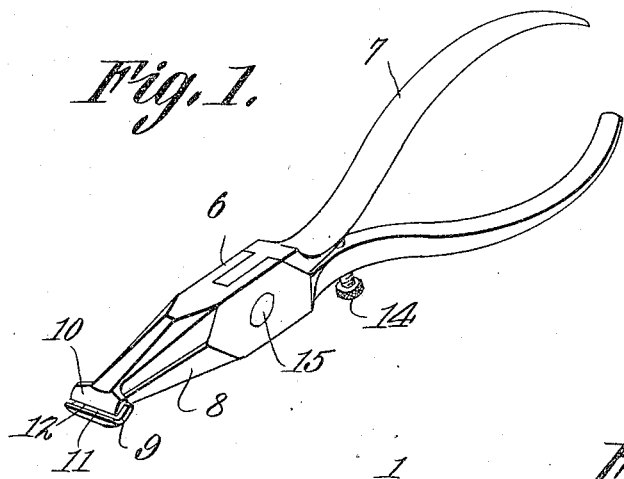
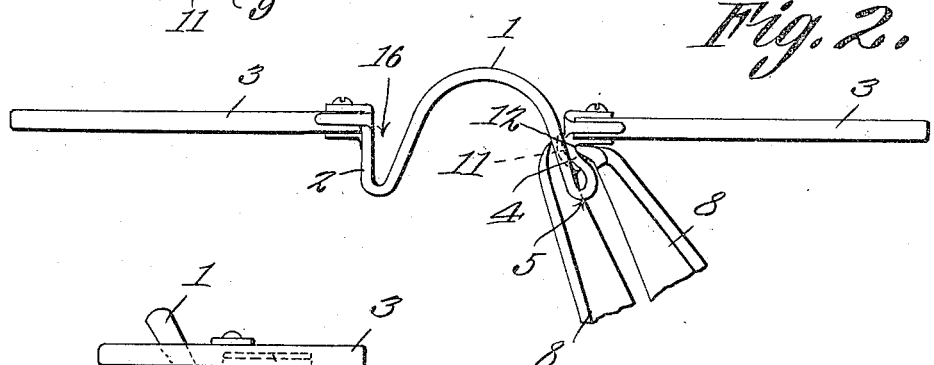
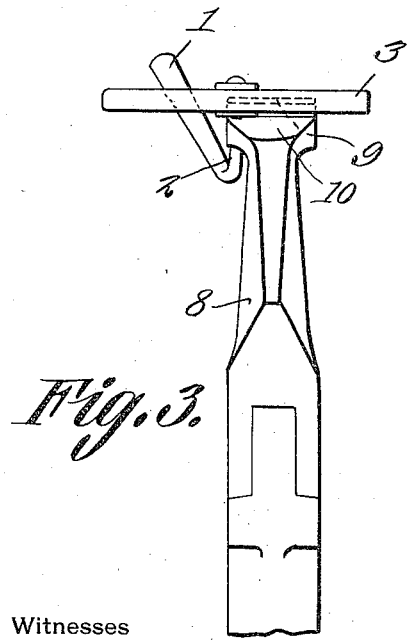
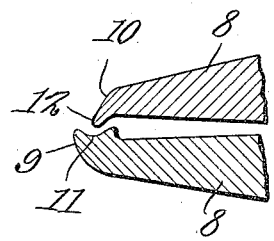
Witnesses
G. G. Worstall
Inventor,
by
Attorneys,

UNITED STATES PATENT OFFICE.

GEORGE GILBERT WORSTALL, OF TOMS RIVER, NEW JERSEY.

PLIERS.

1,178,369.  Specification of Letters Patent.  Patented Apr. 4, 1916.

Application filed December 30, 1915. Serial No. 69,422.

*To all whom it may concern:*

Be it known that I, GEORGE G. WORSTALL, a citizen of the United States, residing at Toms River, in the county of Ocean and State of New Jersey, have invented a new and useful Pliers, of which the following is a specification.

By way of explanation it may be stated that it is the common practice with opticians to put bends in the shanks of the bridge of a pair of spectacles, and, at times, to bend the shanks inwardly toward the center of the bridge, in order that the optical centers of the lenses may be positioned properly with respect to the eyes of the wearer. This bending of the shanks of the bridge, in the absence of a tool of the type shown in this application, is fraught with considerable difficulty, because both the right and left hand shanks must be bent, because the space between the shanks of the bridge and the body of the bridge is limited, and because the lenses or the lens frames generally are in the way.

The object of the present invention, in view of the foregoing, is to provide a simple tool whereby, without removing the lenses from the spectacle frame, either the right hand or the left hand shank may be bent and, in addition to the bending above mentioned, may if desired, be carried inwardly toward the center of the bridge.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows in perspective, a bending tool embodying the present invention; Fig. 2 shows in plan, a portion of a pair of spectacles, a part of the bending tool being shown applied to the spectacles; Fig. 3 is an elevation wherein the bending tool is shown applied, the view point in Fig. 3 being ninety degrees remote from the view point in Fig. 2; Fig. 4 is a longitudinal section showing the working ends of the tool.

In the accompanying drawings, the numeral 1 indicates the bridge of a pair of spectacles, provided with shanks 2 carrying lenses 3. It is the common practice to put into each shank 2, a bend 4, in order that the optical centers of the lenses may be adjusted with respect to each other and with respect to the eyes of the wearer, it being necessary, further, at times, to carry the shanks 2 bodily toward the center of the bridge 1, the shanks under such circumstances bending from the point indicated at 5 in Fig. 2.

In this application there is shown a tool adapted to carry out the operations above mentioned, the tool comprising a pair of levers 6 terminating each at one end in a handle 7 and terminating each at the opposite end in a jaw 8. The levers are crossed upon each other and are united intermediate their ends by a pivot element 15. As stated, the forward ends of the levers 6 terminate in jaws 8, one jaw 8 being provided with a transverse head 9 and the other jaw being provided with a transverse head 10. In the jaw 9 there is formed a transverse groove 11. The head 10 terminates in an angular lip 12 disposed opposite to the deepest portion of the groove 11, as clearly shown in Fig. 4. Threaded into one of the handles 11 is a gage screw 14 which, coacting with the other handle prevents the lip 12 from approaching the bottom of the groove 11 too closely, a contingency tending to mar or cut off the shank 2 of the bridge.

In practical operation, the inner side of the bridge shank 2 is received in the groove 11, the outer side of the bridge shank being engaged by the lip 12. When the handles 7 are pressed together, the lip 12 will coöperate with the groove 11 to form the bend 4 and, by a turn of the wrist, the operator may bend the shank 2 still further, bodily, to effect the necessary adjustment. It is to be observed that the groove 9 and the lip 12 project upon both sides beyond the jaws 8. Owing to this construction, the tool may be shifted readily from one shank 2 to the other and may be introduced into the space 16 between the shank 2 and the body portion of the bridge 1.

Having thus described the invention, what is claimed is:—

1. A device for bending the shanks of the bridges of spectacles, and comprising a pair of crossed levers, terminating at one end in handles and terminated at their other ends in straight jaws, the jaws being provided at their ends with transverse heads, one head being equipped with a transverse concaved groove adapted to fit against the inner side of a bridge shank, and the other head being provided with an inclined tapered lip disposed opposite to the deepest part of the groove, the lip being of small thickness compared with the width of the groove at its mouth, the lip being adapted to be placed against the outer side of a bridge shank, whereby when the handles are pressed together, the groove and the lip will coöperate to put a bend in the shank, the grooved head and the lip projecting beyond both sides of the jaws, whereby the device may be applied to either shank of a bridge.

2. A device for bending the shanks of the bridges of spectacles, and comprising a pair of crossed levers terminating at one end in handles and terminated at their other ends in jaws, the jaws being provided at their ends with transverse heads, one head being equipped with a transverse groove adapted to fit against the inner side of a bridge shank, and the other head being provided with an inclined lip disposed opposite to the deepest part of the groove and adapted to be placed against the outer side of a bridge shank, whereby, when the handles are pressed together, the groove and the lip will coöperate to put a bend in the shank, the grooved head and the lip projecting beyond both sides of the jaws, whereby the device may be applied to either shank of a bridge; and a gage screw threaded into one handle and adapted to coöperate with the other handle.

In testimony that I claim the foregoing as my own, I have hereto affixed my signature in the presence of two witnesses.

GEORGE GILBERT WORSTALL.

Witnesses:
DAVID C. BREWER,
LOUIS W. TILTON.